United States Patent
Read et al.

(10) Patent No.: US 8,094,042 B2
(45) Date of Patent: Jan. 10, 2012

(54) AIRCRAFT STEERING ANGLE WARNING SYSTEM

(75) Inventors: Terry George Read, Bristol (GB);
Andreas Yiasoumi, Bristol (GB); David George Stinchcombe, Bristol (GB);
Andrew David Sadler, Bristol (GB);
Alex Robert Piddock, Wiltshire (GB)

(73) Assignee: Airbus Operations Limited, Bristol (GB)

( * ) Notice: Subject to any disclaimer, the term of this patent is extended or adjusted under 35 U.S.C. 154(b) by 395 days.

(21) Appl. No.: 12/280,356

(22) PCT Filed: Feb. 23, 2007

(86) PCT No.: PCT/GB2007/000633
§ 371 (c)(1),
(2), (4) Date: Aug. 22, 2008

(87) PCT Pub. No.: WO2007/110566
PCT Pub. Date: Oct. 4, 2007

(65) Prior Publication Data
US 2009/0040072 A1    Feb. 12, 2009

(30) Foreign Application Priority Data
Mar. 27, 2006  (GB) .................................. 0606087.5

(51) Int. Cl.
*G08B 21/00* (2006.01)
(52) U.S. Cl. ..................... 340/960; 340/958; 244/103 R; 701/4; 701/41; 414/426; 180/14.6; 280/426
(58) Field of Classification Search .................. 340/945, 340/958, 960, 973; 244/167, 171, 103 R, 244/109; 414/426, 427, 428; 701/4, 41; 180/14.6, 421; 280/426
See application file for complete search history.

(56) References Cited

U.S. PATENT DOCUMENTS

| 3,885,759 A | 5/1975 | Lear |
| 4,113,041 A | 9/1978 | Birkeholm |
| 5,516,252 A | 5/1996 | Francke et al. |
| 5,558,350 A * | 9/1996 | Kimbrough et al. .......... 280/426 |

(Continued)

FOREIGN PATENT DOCUMENTS

DE    19808836 A1    9/1999

(Continued)

OTHER PUBLICATIONS

Derwent-Acc-No. 1999-421571, Criquillion et al, Control of angle between towing vehicle and trailer, Copyright 2010 Derwent Information Ltd.*

(Continued)

*Primary Examiner* — George Bugg
*Assistant Examiner* — Anne Lai
(74) *Attorney, Agent, or Firm* — Lowe, Hauptman, Ham & Berner, LLP (57) ABSTRACT

A steering angle warning system comprising a rotation-measuring unit located on an aircraft, and an alarm unit. The rotation-measuring unit is arranged to output a first signal dependent on the steering angle between a nose landing gear of the aircraft and the longitudinal axis of the aircraft fuselage. The alarm unit is arranged to generate an alarm, in dependence on the first signal, when the steering angle is greater than a predetermined value, for example, 60 degrees. The rotation-measuring unit may also be arranged to perform a function in relation to an aircraft steering system, for example to indicate the steering angle to the pilot during ground manoeuvres.

30 Claims, 4 Drawing Sheets

U.S. PATENT DOCUMENTS

| | | | |
|---|---|---|---|
| 5,680,125 A | 10/1997 | Elfstrom et al. | |
| 6,014,608 A * | 1/2000 | Seo | 701/207 |
| 6,397,133 B1 * | 5/2002 | van der Pol et al. | 701/37 |
| 6,641,085 B1 * | 11/2003 | Delea et al. | 244/50 |
| 6,928,363 B2 * | 8/2005 | Sankrithi | 701/120 |
| 7,477,973 B2 * | 1/2009 | Brewer et al. | 701/41 |
| 2003/0165375 A1 * | 9/2003 | Johansson | 414/427 |
| 2005/0196256 A1 * | 9/2005 | Rodenkirch et al. | 414/426 |

FOREIGN PATENT DOCUMENTS

| | | |
|---|---|---|
| EP | 0934879 A1 | 8/1999 |
| EP | 1574430 A1 | 3/2005 |
| GB | 2297158 A | 7/1996 |
| SE | 501788 C2 | 5/1995 |
| WO | 03070569 A1 | 8/2003 |
| WO | 2006035132 A2 | 4/2006 |

OTHER PUBLICATIONS

EP 934879A1—Partial Translation, 2010.*

ISR and Written Opinion for PCT/GB2007/000633 dated Jul. 31, 2007.

UK Search Report for GB0606087.5 dated Jul. 31, 2006.

* cited by examiner

AIRCRAFT STEERING ANGLE WARNING SYSTEM

RELATED APPLICATIONS

The present application is based on International Application Number PCT/GB2007/000633 filed Feb. 23, 2007, and claims priority from British Application Number 0606087.5 filed Mar. 27, 2006, the disclosures of which are hereby incorporated by reference herein in their entirety.

BACKGROUND OF THE INVENTION

The present invention relates to a steering angle warning system, an aircraft and/or tow vehicle including a steering angle warning system, and a method of warning against excessive steering angle on an aircraft.

Movement of an aircraft on the ground is often effected by a towing tractor engaged with the aircraft nose landing gear. It may be possible for the towing tractor to turn the nose landing gear through an excessive steering angle and damage the nose landing gear assembly.

Some systems are known to provide a warning against excessive steering angle. For example, it is known to have coloured markings on the rotatable leg of the nose landing gear and coloured markings on the body of the aircraft and/or on a stationary part of the nose landing gear. The markings are so arranged that their alignment with one another acts as a visual warning that the nose landing gear has turned through an excessive angle. Such a system may, however, be ineffective as it can be adversely affected by factors such as poor visibility and driver distraction.

Another warning system is described in U.S. patent application Ser. No. 10/795,539 (US 2005/0196256). The warning system includes two ultrasonic sensors mounted on a towing tractor, at least one of the sensors being arranged to detect the presence of the aircraft structure above it when the steering angle is relatively low, and to fail to detect the aircraft structure when the steering angle is relatively large. Thus when one of the sensors fails to detect the presence of the aircraft structure, the system alerts the operator that the steering angle may be becoming too large. Such a system requires the use of a specifically designed tractor and is thought to be unduly complex. The system also relies on detecting a signal reflected from the aircraft structure and may therefore be adversely affected by dirt or foreign objects on the detector. Furthermore, the system needs to be calibrated in dependence on the particular aircraft model being towed.

SUMMARY OF THE INVENTION

The present invention seeks to mitigate at least one of the above-mentioned disadvantages. The present invention alternatively or additionally seeks to provide a simple, reliable and/or effective means for providing a warning of excessive steering angle during an aircraft ground manoeuvre.

The present invention provides a steering angle warning system comprising a rotation-measuring unit located on an aircraft, the rotation-measuring unit being arranged to output a first signal dependent on the steering angle between a nose landing gear of the aircraft and the longitudinal axis of the aircraft fuselage, and an alarm unit arranged to generate an alarm, in dependence on the first signal, when the steering angle is greater than a predetermined value.

As the rotation-measuring unit is located on the aircraft, the warning system may be used whenever and wherever the aircraft is being towed, and need not be dependent on the use of a particular type of towing vehicle. In addition, the towing vehicle does not necessarily require any modifications.

The rotation-measuring unit is preferably wholly located on the aircraft.

The term "steering angle" will be readily understood by the person skilled in the art. However, in the event of any uncertainly over the meaning of the term, the term "steering angle" will be understood to mean the angle (when viewed from above) between the skid-free forward rolling travel of the wheel(s) of the nose landing gear and the longitudinal axis of the aircraft. Thus a steering angle of 0 degrees corresponds to the nose landing gear facing in a direction parallel to the longitudinal axis of the aircraft, and a steering angle of 60 degrees corresponds to the nose landing gear being inclined at an angle of 60 degrees to the longitudinal axis of the aircraft, that angle being measured from the front of the aircraft in either a clockwise or anti-clockwise direction.

Certain elements of the steering angle warning system may be such that they would be present on certain aircraft even if the steering angle warning system of the present invention were not installed on that aircraft. For example, such elements may be such that they would be provided in any case to perform a different function from their function in the steering angle warning system of the present invention. Certain elements of the steering angle warning system may also be integrated with systems of an aircraft. In embodiments of the invention that relate to retrofitting of a steering angle warning system, such elements are already arranged on the aircraft. Certain elements of the steering angle warning system may be arranged to perform a function in relation to the steering angle warning system and a further function in relation to a system other than the steering angle warning system.

The rotation-measuring unit may be part of an aircraft steering system. The rotation-measuring unit may be arranged to output a second signal dependent on the steering angle and the aircraft steering system may be arranged to provide, to the pilot, an indication of the steering angle in dependence on the second signal. It will be appreciated that in certain embodiments of the invention, the first and second signals may be one and the same. For example, the rotation-measuring unit may be arranged to output a single signal dependent on the steering angle, that signal being used by both the steering system and the steering angle warning system.

An arrangement in which an element of the steering angle warning system is part of, or is integrated with, another system on the aircraft is particularly advantageous since this enables the warning system to be relatively simple and for example may require relatively little modification of an existing aircraft when retrofitting the steering angle warning system, and/or may require relatively little modification of future aircraft design. In addition, existing aircraft systems are typically very reliable, having passed stringent safety tests.

A typical aircraft may have at least one Rotary Variable Differential Transducer (RVDT) fitted to the nose landing gear. An RVDT provides an output signal, typically a voltage, that is dependent on, typically being proportional to, the steering angle of the nose landing gear, and is typically linked with the hydraulics of the aircraft steering system. The rotation-measuring unit of an embodiment of the present invention may comprise a Rotary Variable Differential Transducer (RVDT). The rotation-measuring unit may comprise a plurality of RVDTs. The rotation-measuring unit may be located on the nose landing gear.

The alarm may be an audible alarm. Alternatively or additionally, the alarm may be a visible alarm. The alarm may, for example, be a light. The light may be coloured. The alarm may be a strobe light. A strobe light is thought to be particularly effective as an alarm as it is highly visible in most conditions.

The alarm unit is preferably located close to the towing ground crew during normal towing operations. The alarm unit may be located on the aircraft. For example, the alarm unit may be located on the nose landing gear of the aircraft. The alarm unit may be located at a location which does not change in dependence on the steering angle. For example the alarm unit may be located on the main fitting of the nose landing gear, and be visible to the tow vehicle driver through all towing angles.

The alarm unit may be located on a towing vehicle, the towing vehicle being arranged to tow the aircraft. Such an arrangement is particularly beneficial when, for example, the landing gear is not visible from the cabin of the towing vehicle.

The steering warning system may comprise a plurality of alarm units (for example a primary alarm unit located on the aircraft and a secondary alarm unit located on a tow vehicle) arranged to generate an alarm when the steering angle is greater than a predetermined value. Reference herein to 'an alarm unit' will, of course, be understood to apply equally to one or more alarm units in a plurality of alarm units. When more than one alarm unit is provided, the alarm units may be configured or arranged differently. For example, one alarm unit may be arranged to generate an audible alarm, whilst the other is arranged to generate a visible alarm.

The alarm unit is preferably arranged to generate the alarm when the steering angle is close to, and/or more than, the maximum allowable steering angle. Thus, the predetermined value is preferably close to, or equal to the maximum allowable steering angle. The maximum allowable steering angle is typically the angle beyond which there is a significant risk of damage occurring to the landing gear. The predetermined value may be between 60% and 100% of the aircraft maximum allowable steering angle. The predetermined value may be between 70% and 95% of the aircraft maximum allowable steering angle. The predetermined value may be between 80% and 90% of the aircraft maximum allowable steering angle.

The predetermined value may be between 40 and 70 degrees. The predetermined value may be between 55 and 65 degrees.

It will be understood that an alarm unit generating an alarm, merely refers to a change in state of the alarm unit from an unalarmed state to an alarmed state. For example, the present invention encompasses the concept of the alarm unit emitting a sound/light etc. when the steering angle is less than a particular value and said sound/light ceasing when the angle exceeds the particular value. In that case, the term alarm will be understood to encompass a change of background state (for example from noise to silence).

The alarm unit may also be arranged to generate the alarm if, and preferably only if, certain other parameters (other than the steering angle being greater than a particular value) are met. The other parameters may include a user input. For example, the alarm unit may be arranged to generate the alarm only if the tow key is engaged. This may prevent the alarm being generated accidentally, when the aircraft is not being towed. The alarm unit may be arranged to generate the alarm for a short period after the tow key has been engaged. This arrangement may provide an assurance to the user of the system functionality.

The steering angle warning system may comprise a comparator unit for determining whether the steering angle is greater than the predetermined value. The steering angle warning system may comprise a comparator unit, wherein the comparator unit is arranged to receive the first signal, to determine, in dependence on the first signal, whether the steering angle is greater than the predetermined value, and to output a control signal to the alarm unit in dependence on this determination, the alarm unit being arranged to receive the control signal and to generate the alarm in dependence on the control signal. The comparator unit may comprise an electronic circuit, for example comprising a simple potential divider or Wheatstone bridge. The electronic circuit may be integrated with other circuitry of the aircraft. The comparator unit may comprise a diode. The comparator unit may comprise a logic arrangement.

The comparator unit may comprise a software module. The software module may be integrated with other software systems on the aircraft. The comparator unit comprising a software module is particularly beneficial, as software tends to be relatively cheap to install and is easy to maintain.

The comparator unit may be arranged to determine whether the steering angle is above a particular threshold (typically the threshold angle is just below the maximum allowable steering angle). For example, the comparator unit may be arranged to compare the first signal to a threshold and to output the control signal in dependence on this comparison. The comparator unit may be arranged to determine whether the steering angle is approaching the maximum allowable steering angle. For example, the comparator unit may determine the rate of change of the steering angle and determine whether the maximum allowable steering angle will be exceeded within a predetermined (relatively short) period of time. If it seems likely that the angle will be exceeded the comparator unit may output the control signal. Thus, the control signal may be outputted in cases where the steering angle does not exceed the predetermined value. Such an arrangement may be beneficial because it may provide an early warning, which may prevent significant damage from being caused in cases where the rate of change of steering angle is large when the steering angle approaches the maximum allowable angle.

It shall be understood that whilst signals used in embodiments of the invention, such as for example the first signal, second signal and/or control signal, will typically (and preferably) be in the form of electrical signals, such as for example a voltage, the signals may be mechanical signals such as movement of a gear or lever. In addition, it will be understood that a state of a "signal" may include zero, in which state there is no physical signal, as such. For example the states of an electric signal may include 0 volts.

Of course, the control signal may be substantially identical to the first signal. For example, the comparator unit may simply relay the first signal to the alarm unit if the steering angle exceeds the predetermined value.

According to another aspect of the invention, there is provided an aircraft comprising a nose landing gear and an aircraft steering system comprising a rotation-measuring unit, the rotation-measuring unit being arranged to output, during use, a first signal, dependent on the steering angle to an interface, the interface being so arranged to enable an alarm unit to receive from the interface a signal that enables the alarm unit, when so arranged, to generate during use an alarm when the steering angle is greater than a predetermined value. The interface is preferably separate from any means arranged to provide, to the pilot, an indication of the steering angle. Preferably, the rotation-measuring unit is further arranged to output, during use, a second signal also dependent on the steering angle to provide, to the pilot, an indication of the steering angle.

The alarm unit is preferably located on the aircraft (for example on the nose landing gear) but need not necessarily be. Thus, the aircraft according to the invention may or may not comprise the alarm unit. The aircraft may, for example, be associated with a towing vehicle engaged with the nose landing gear, wherein the alarm unit is located on the towing vehicle. The present invention thus further provides such an aircraft with such a towing vehicle. Such an arrangement is thought to be particularly beneficial in an embodiment of the present invention in which the steering angle warning system comprises a plurality of alarm units, since at least one alarm may be located on the aircraft and at least one alarm may be located on the towing vehicle.

It will also be appreciated that the interface is preferably located on the aircraft but need not necessarily be. At least part of the interface may be located on the aircraft. At least part of the interface may be located on the tow vehicle. At least part of the interface may be located with the alarm unit. For example, in an embodiment of the invention in which the alarm unit is located on the tow vehicle, the interface may also be located on the tow vehicle, the alarm unit and the aircraft.

The interface may comprise a connector, such as a socket for example, to which in use the first signal, or a signal dependent thereon, is sent, allowing a cable to be connected in use to the connector to convey the signal to an alarm unit. The interface may comprise a cable, for example a cable directly linking the rotation-measuring unit and the alarm unit for transmission of the first signal. The interface may link the aircraft and the tow vehicle. The interface may be arranged to allow wireless communication, for example wireless communication of the first signal to the alarm unit.

The rotation-measuring unit may be arranged to output the first signal, via a comparator unit, the comparator unit being arranged to determine, in dependence on the first signal, whether the steering angle is greater than the predetermined value, and to output a control signal to the alarm unit in dependence on this determination, the alarm unit being arranged to receive the control signal and to generate the alarm in dependence on the control signal.

The comparator unit may be located on the aircraft. The comparator unit may be located on the tow vehicle. The interface may be arranged to enable the alarm unit to receive the control signal.

According to yet another aspect of the invention, there is provided an aircraft comprising a nose landing gear and a rotation-measuring unit for measuring the steering angle of the nose landing gear, wherein the rotation-measuring unit is arranged, during use, to output a first signal, dependent on the steering angle, to an alarm unit, the alarm unit being arranged to generate an alarm in dependence on the first signal, when the steering angle is greater than a predetermined value. The aircraft may further comprise a steering system, wherein the rotation-measuring unit is arranged to output a second signal dependent on the steering angle, and the aircraft steering system is arranged to provide, to the pilot, an indication of the steering angle in dependence on the second signal. The alarm unit may be located on the aircraft.

According to yet another aspect of the present invention, there is provided a method of warning against excessive steering angle on an aircraft comprising the steps of: (i) outputting, from a rotation-measuring unit located on the aircraft, a first signal dependent on the steering angle between a nose landing gear of the aircraft and the longitudinal axis of the aircraft fuselage, (ii) determining, in dependence on the first signal, whether the steering angle is greater than a predetermined value, and if the steering angle is greater than the predetermined value,(iii)generating an alarm. The step of determining whether the steering angle is greater than the predetermined value may be performed by a comparator unit. The method may further comprise the steps of outputting, from the comparator unit, a control signal in dependence on the determination, receiving the control signal at the alarm unit, and generating the alarm in dependence on the control signal.

According to yet another aspect of the invention, there is provided a kit of parts comprising an alarm unit and an interface enabling the alarm unit to receive from a rotation-measuring device a first signal, the kit of parts being suitable for converting an aircraft into an aircraft according to the present invention. The present invention therefore provides a kit suitable for retrofitting the steering angle warning system to an aircraft.

The kit of parts may also comprise a comparator unit for determining whether the steering angle is greater than a predetermined value.

According to yet another aspect of the invention, there is provided a towing vehicle for towing an aircraft, the towing vehicle comprising an alarm unit arranged to receive a first signal from a rotation-measuring device on the aircraft, the alarm unit being further arranged to generate an alarm in dependence on the first signal, when the aircraft steering angle is greater than a predetermined value.

It will be appreciated that features described in respect of one aspect of the invention are equally applicable to other aspects of the invention. For example, the towing vehicle may further comprise a comparator unit as described herein.

DESCRIPTION OF THE DRAWINGS

Various embodiments of the invention will now be described, by way of example only, with reference to the accompanying schematic drawings of which.

DETAILED DESCRIPTION

Figure 1A:
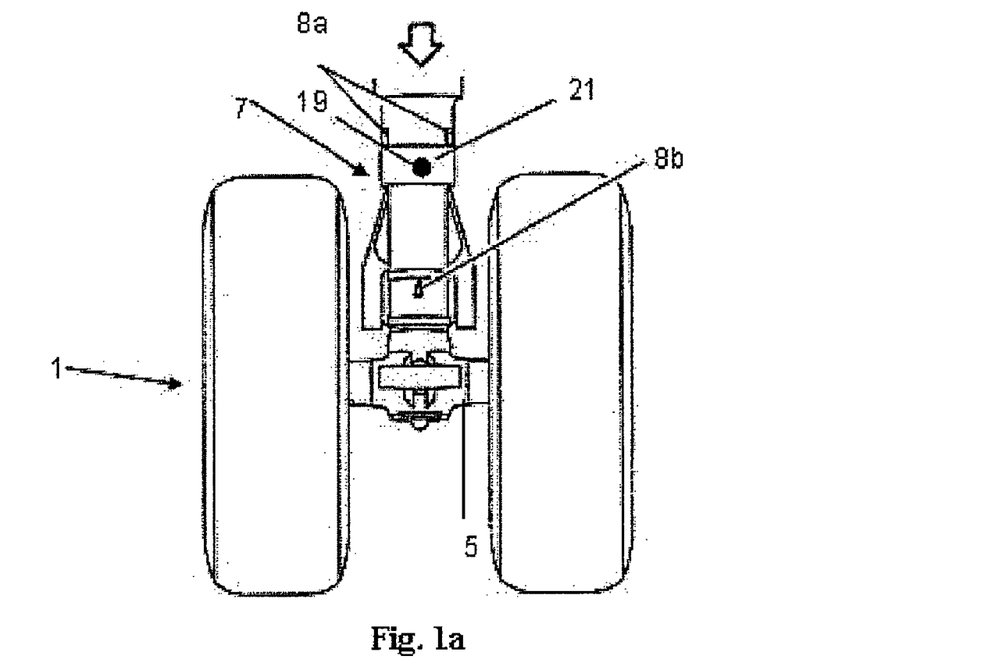
FIGS. 1a and 1b are views of the nose landing gear on an aircraft comprising a steering angle warning system according to a first embodiment of the invention.
Figure 1B:
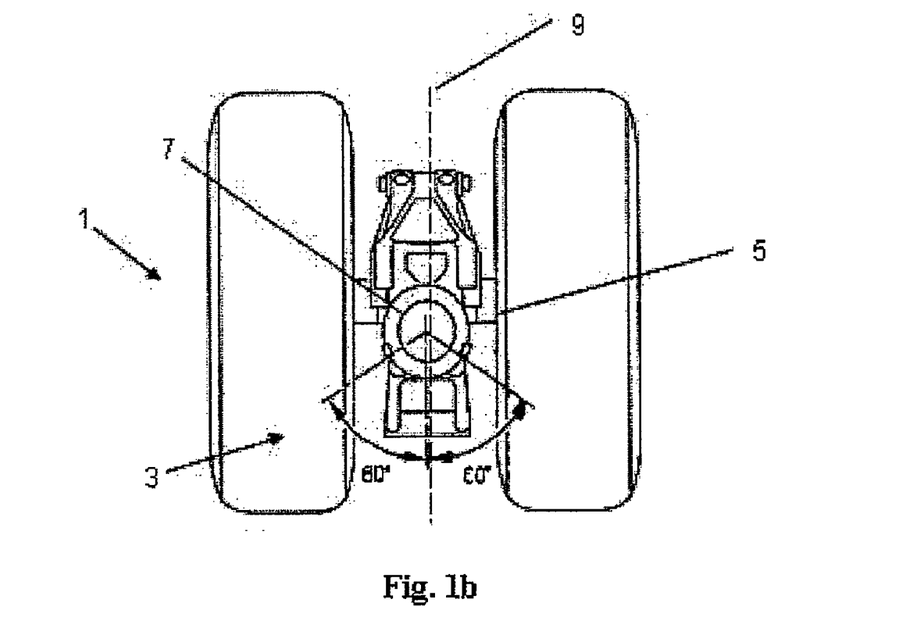

FIGS. 1a and 1b are views of an aircraft nose landing gear 1 on an aircraft 6 (see FIG. 1c) according to a first embodiment of the invention. The nose landing gear comprises two wheels 3 located either side of a central axle 5. The axle 5 is mounted on the end of the landing gear leg 7. The nose landing gear 1 is shown with a steering angle of zero degrees in which the axle 5 is perpendicular to the longitudinal axis 9 of the aircraft. The nose landing gear has a maximum allowable steering angle of 60 degrees, beyond which damage may occur to the landing gear.

Figure 1C:
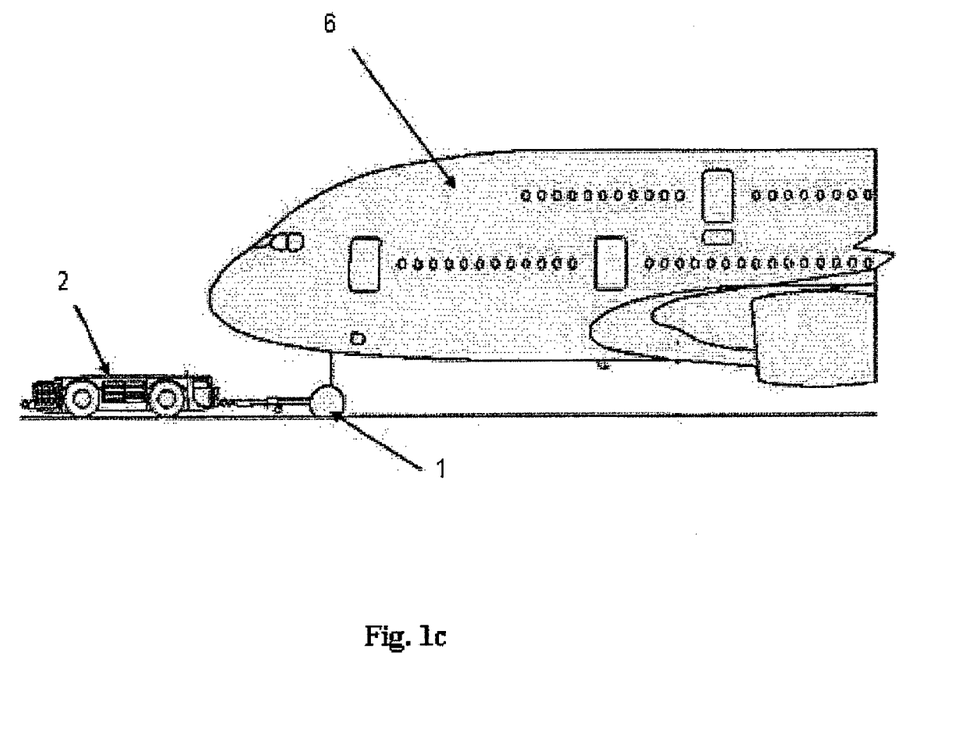
FIG. 1c is a view of the aircraft, of the first embodiment, being towed by a tow vehicle.

Referring to FIG. 1c, during on-ground manoeuvres, a towing vehicle 2 engages with the nose landing gear 1. A tow key is inserted into a steering disconnect panel (not shown) to allow certain parts of the landing gear hydraulics to be disconnected (as is conventional in the art). When those hydraulic parts are disconnected, the landing gear is, to some degree, free to rotate under the influence of the tow vehicle. It is therefore possible for the tow vehicle 2 to turn the landing gear 1 at an excessive steering angle and past its mechanical limits, causing considerable damage to the nose landing gear 1 and, in some cases, the surrounding structure.

To help prevent such a situation, the nose landing gear 1 comprises markers 8a and 8b on the main fitting 21 and the lower portion of the landing gear 1 respectively, in a manner similar to arrangements of the prior art. When the markers align, the maximum allowable steering angle has been reached. Such a warning system by itself is known to have problems including being limited by poor visibility and being susceptible to driver distraction. The aircraft 6 according to the first embodiment of the invention therefore further includes a steering angle warning system, as described in detail with reference to FIG. 2.

Figure 2:
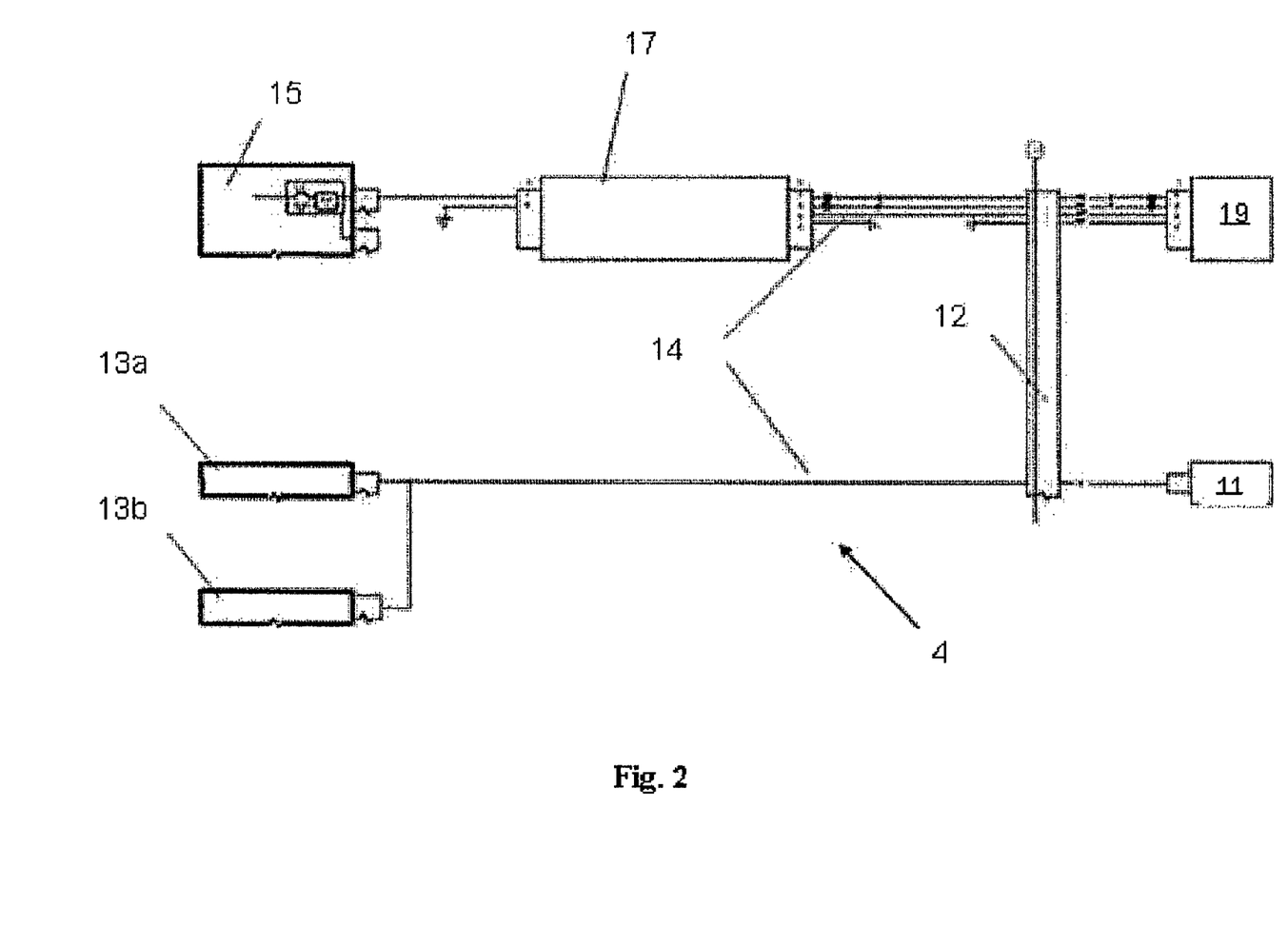
FIG. 2 is a schematic of the steering angle warning system according to the first embodiment of the invention.

FIG. 2 is a schematic of the steering angle warning system 4 according to a first embodiment of the invention. The steering angle warning system 4 is entirely located on the aircraft and has been retrofitted. The steering angle warning system 4 comprises a rotation-measuring unit 11, two comparator units 13a, 13b and an alarm unit 19. The rotation-measuring unit 11 and the alarm unit 19 are located on the aircraft nose landing gear, whilst the comparator units 13a, 13b are located on the aircraft main body (a connecting apparatus 12 ensures electrical connection between the comparator units and the rotation-measuring and alarm units on the pivotably mounted landing gear 1).

The elements of the steering angle warning system 4 are described in detail below.

The rotation-measuring unit is in the form of a Rotary Variable Differential Transducer (RVDT) 11. The RVDT 11 outputs a first signal (in the form of a voltage) in dependence on the extension of various hydraulic rams in the nose landing gear structure, and thus in dependence on the aircraft steering angle.

The first signal from the RVDT is output, during use, to an interface. In the first embodiment of the invention, the interface is simply in the form of cabling 14 and the relevant parts of the connecting apparatus 12 that together directly connect the elements of the steering angle warning system.

The RVDT 11 is also part of the aircraft steering system (not shown). The steering system is used when the aircraft is being manoeuvred on the ground under engine power, and provides the pilot with an indication of the steering angle. As part of the steering system, the RVDT is arranged to output a second signal (not shown) for use in the steering system. The second signal is dependent on the steering angle and is, in the first embodiment of the invention, substantially identical to the first signal. Thus the second signal is also sent to the connecting apparatus 12 and from there is sent to the part of the steering system that causes the steering angle to be displayed in the cockpit.

The comparator units 13a, 13b are arranged to receive the first signal from the RVDT 11 via the interface 14.

The provision of two comparator units is such that the second unit 13b is redundant until/unless the first unit fails. The comparator units are integrated with the aircraft Core Processing input/Output Module (CPIOM). The CPIOM comprises many processing units and software modules, and is used to process much of the sensory data on the aircraft.

The primary comparator unit 13a of the steering angle warning system is arranged to determine (in dependence on the first signal received from the RVDT) whether the steering angle is greater than a predetermined value. In the first embodiment of the invention, the primary comparator unit 13a includes a Zener Diode (not shown). The Zener Diode is arranged such that, during use, when the steering angle is less than 60 degrees (and corresponding RVDT output voltage is less than a threshold voltage), the comparator unit produces no output. However, as soon as the steering angle becomes greater than 60 degrees (and corresponding RVDT voltage becomes greater than the threshold voltage), the Zener Diode is arranged to output a control signal to a Secondary Electrical Power Distribution Centre (SEPDC) 15.

The SEPDC 15 is connected to an alarm unit 19. When the control signal is received by the SEPDC, the SEPDC sends a further signal (via the Power source 17) to the alarm unit 19.

The alarm unit 19 is in the form of a red strobe light, and is coupled with a power source 17 which is arranged to provide suitable electrical power to the strobe 19. When the signal from the SEPDC is received via the interface 14, the strobe is switched on thereby generating an immediate, rapidly-strobing and highly-visible alarm.

If and when the steering angle falls back below 60 degrees, the comparator unit 13a ceases to send a control signal to the SEPDC 15 and the strobe is returned to its unalarmed state.

Referring back to FIGS. 1a, 1b and 1c, the strobe 19 is mounted on the main fitting 21 of the nose landing gear leg 7. The strobe has a wide light distribution and, when generating the alarm, is visible from a position transverse to the axis of the aircraft and level with the nose landing gear. The strobe light is therefore easily visible from both the towing vehicle 2 and by ground staff (not shown) in the vicinity of the landing gear.

The steering angle warning system of the first embodiment of the invention therefore provides an effective warning to the towing vehicle ground staff and others in the aircraft vicinity, when the steering angle exceeds 60 degrees. In addition, since the RVDT 11 is a standard component already used in the aircraft steering system, and the comparator units 13a, 13b are simple diode devices integrated with the aircraft CPIOM, the warning system is particularly simple and reliable.

Figures 3A, 3B:
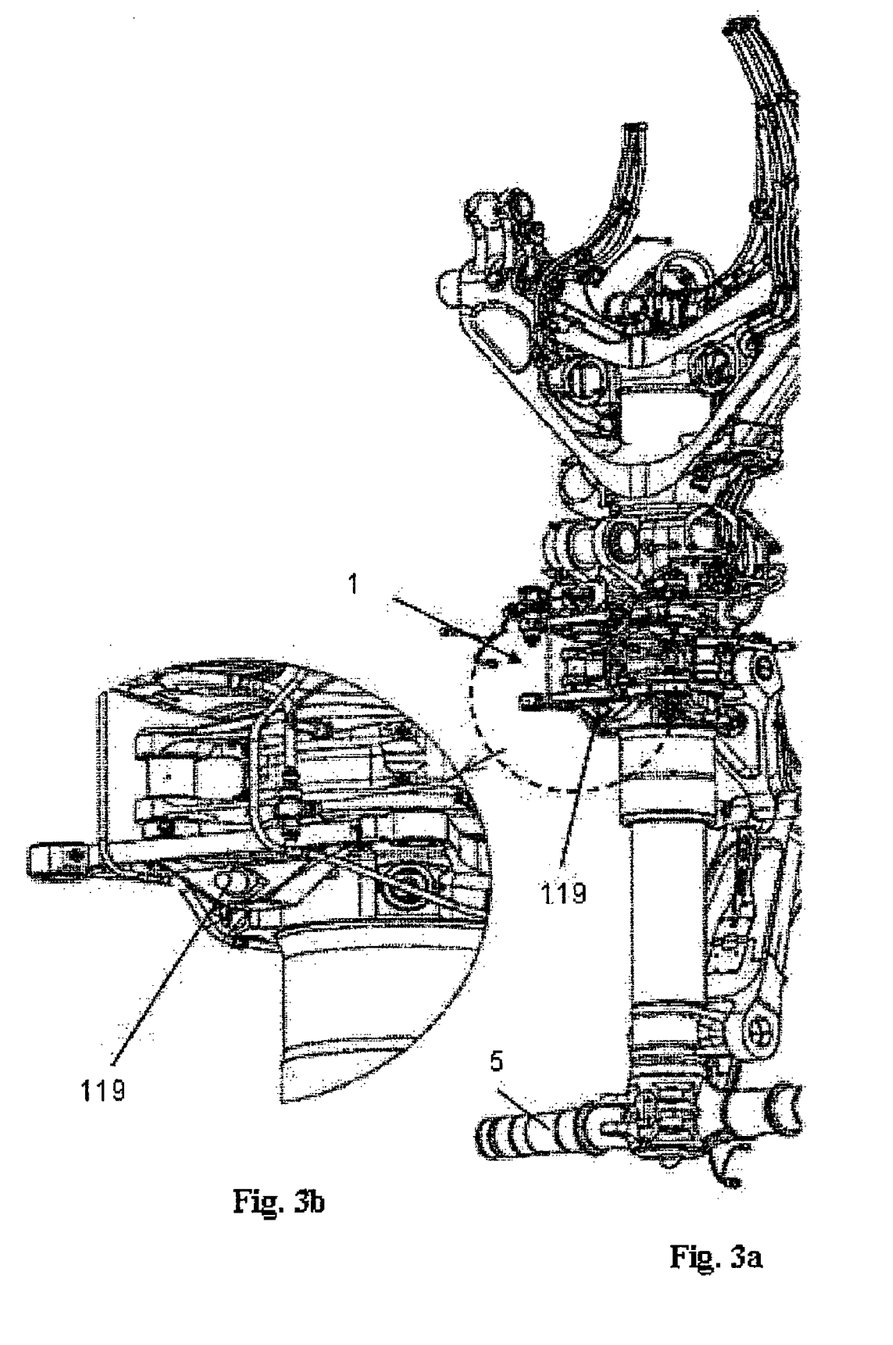
FIGS. 3a and 3b are perspective views of an aircraft nose landing gear comprising a steering angle warning system according to a second embodiment of the invention.

FIGS. 3a and 3b are perspective views of an aircraft nose landing gear comprising a steering angle warning system according to a second embodiment of the invention. The region enclosed by the thick dashed line of FIG. 3a, is shown in close-up in FIG. 3b.

The steering angle warning system is primarily as described with reference to the first embodiment except for the changes described below.

The first signal from the rotation-measuring device is received (via an A/D converter) by a software module (not shown). The software module forms part of the main software system of the aircraft and is arranged to determine, in dependence on the first signal, whether the steering angle is greater than 55 degrees. The software module is arranged to output a control signal to an alarm unit 119 when the steering angle has been determined to be greater than 55 degrees.

When the control signal is received, an alarm is generated by the strobe light 119 on the landing gear leg. Thus when the steering angle is approaching 60 degrees (the alarm being generated when the angle exceeds 55 degrees) an alarm is provided.

The steering angle warning system of the second embodiment of the invention comprises two alarm units. The first alarm unit is a strobe light 119 located on the landing gear (described above) and the second unit is a buzzer located on the towing vehicle (not shown).

The software module is programmed to also output the control signal to the buzzer when the steering angle is approaching 60 degrees.

To facilitate transmittal of the control signal from the software module to the buzzer on the tow vehicle, the aircraft and tow vehicle comprise an interface. The interface comprises a first connector located on the aircraft steering disconnect panel, and a corresponding second connector located on the dashboard of the tow vehicle. The connectors are, during use, linked by a cable that has been plugged in by ground staff.

During use, the software module outputs the control signal to the first connector, and the cable transmits the control signal to the buzzer via the second connector. The interface on the aircraft therefore enables the buzzer, during use, to receive the control signal, the control signal itself enabling the buzzer on the tow vehicle to generate an alarm when the steering angle is greater than 55 degrees.

The warning system thus provides a dual warning for the, albeit unlikely, situation where the towing vehicle driver cannot see the strobe 119.

The software module of the second embodiment of the invention is also arranged to perform a number of other functions. In particular, the software prevents the alarm being generated unless the tow key is inserted into the steering disconnect panel. This helps prevent accidental emission of the alarm. In addition, the software is arranged to activate the alarm for a period of five seconds after the tow key has been inserted into the disconnect panel. This can be used to check that the system is working each time the aircraft is towed.

The nose landing gear on the aircraft according to the second embodiment of the invention does not comprise markers 8a and 8b for denoting the steering angle.

Whilst the present invention has been described and illustrated with reference to particular embodiments, it will be appreciated by those of ordinary skill in the art that the invention lends itself to many different variations not specifically illustrated herein. For example, the comparator unit may be simple electrical circuit such as a potential divider. The rotation-measuring unit need not be an RVDT. The software module could be installed on the tow vehicle. The warning system may comprise an interface in the form of an emitter-receiver pair for allowing wireless communication of the first signal to the alarm unit. The system may comprise only one alarm unit, that alarm unit being located on the tow vehicle.

Where in the foregoing description, integers or elements are mentioned which have known, obvious or foreseeable equivalents, then such equivalents are herein incorporated as if individually set forth. Reference should be made to the claims for determining the true scope of the present invention, which should be construed so as to encompass any such equivalents. It will also be appreciated by the reader that integers or features of the invention that are described as preferable, advantageous, convenient or the like are optional and do not limit the scope of the independent claims.

The invention claimed is:

1. A steering angle warning system comprising a rotation-measuring unit completely located on an aircraft, the rotation-measuring unit being arranged to output a first signal dependent on the steering angle between a nose landing gear of the aircraft and the longitudinal axis of the aircraft fuselage, and an alarm unit arranged to generate an alarm, for the purpose of preventing damage to the nose landing gear, the alarm being generated in dependence on the first signal, when the steering angle is greater than a predetermined value, wherein the predetermined value is close or equal to an angle beyond which there is significant risk of damage occurring to the nose landing gear.

2. A steering angle warning system according to claim 1, wherein the rotation-measuring unit is part of an aircraft steering system, the rotation-measuring unit being arranged to output a second signal substantially identical to the first signal and also dependent on the steering angle and the aircraft steering system being arranged to provide, to the pilot, an indication of the steering angle in dependence on the second signal.

3. A steering angle warning system according to claim 1, wherein the rotation-measuring unit comprises a Rotary Variable Differential Transducer (RVDT) located on the aircraft nose landing gear.

4. A steering angle warning system according to claim 1 wherein the alarm unit comprises a strobe light.

5. A steering angle warning system according to claim 1, the alarm unit being located on the aircraft.

6. A steering angle warning system according to claim 1, the alarm unit being located on a towing vehicle, the towing vehicle being arranged to tow the aircraft.

7. A steering angle warning system according to claim 1 wherein the predetermined value is between 80% and 90% of the aircraft maximum allowable steering angle.

8. A steering angle warning system according to claim 1 wherein the predetermined value is between 55 and 65 degrees.

9. A steering angle warning system according to claim 1, further comprising a comparator unit, wherein the comparator unit is arranged to receive the first signal, to determine, in dependence on the first signal, whether the steering angle is greater than the predetermined value, and to output a control signal to the alarm unit in dependence on this determination, the alarm unit being arranged to receive the control signal and to generate the alarm in dependence on the control signal.

10. A steering angle warning system according to claim 9, wherein the comparator unit comprises an electronic circuit.

11. A steering angle warning system according to claim 9, wherein the comparator unit comprises a software module.

12. A steering angle warning system according to claim 1, wherein the alarm unit is arranged to generate the alarm only if a tow key is engaged with the nose landing gear.

13. An aircraft comprising a nose landing gear and an aircraft steering system comprising a rotation-measuring unit, the rotation-measuring unit being arranged to output, during use, a first signal, dependent on the steering angle to an interface, the interface being so arranged to enable an alarm unit to receive from the interface a signal that enables the alarm unit, when so arranged, to generate during use an alarm for the purpose of preventing damage to the nose landing gear when the steering angle is greater than a predetermined value, wherein the predetermined value is close or equal to an angle beyond which there is significant risk of damage occurring to the nose landing gear.

14. An aircraft according to claim 13, wherein the rotation-measuring unit is further arranged to output, during use, a second signal also dependent on the steering angle to provide, to the pilot, an indication of the steering angle.

15. An aircraft according to claim 13, further comprising an alarm unit, the alarm unit being located on the nose landing gear.

16. An aircraft according to claim 13, further comprising a towing vehicle engaged with the nose landing gear and an alarm unit, wherein the alarm unit is located on the towing vehicle.

17. An aircraft according to claim 13, further comprising an interface having a connector to which, in use, the first signal is sent, the connector allowing a cable to be connected thereto to convey the signal to an alarm unit.

18. An aircraft according to claim 17, wherein the interface allows wireless communication of the first signal to the alarm unit.

19. An aircraft according to claim 13, further comprising a comparator unit, wherein the rotation-measuring unit is arranged to output the first signal, via the comparator unit, the comparator unit being arranged to determine, in dependence on the first signal, whether the steering angle is greater than the predetermined value, and to output a control signal to the alarm unit in dependence on this determination, the alarm unit being arranged to receive the control signal and to generate the alarm in dependence on the control signal.

20. An aircraft according to claim 13, wherein the alarm unit is arranged to generate the alarm only if a tow key is engaged with the nose landing gear.

21. A method of warning against excessive steering angle on an aircraft, the method comprising the steps of:
   (i) outputting, from a rotation-measuring unit located on the aircraft, a first signal dependent on the steering angle between a nose landing gear of the aircraft and the longitudinal axis of the aircraft fuselage,
   (ii) determining, in dependence on the first signal, whether the steering angle is greater than a predetermined value which is close or equal to an angle beyond which there is significant risk or damage occurring to the nose landing gear, and if the steering angle is greater than the predetermined value,
   iii) generating an alarm for the purpose of preventing damage to the nose landing.

22. A method according to claim 21, wherein the step of determining whether the steering angle is greater than the predetermined value is performed by a comparator unit, the method further comprising the steps of outputting, from the comparator unit, a control signal in dependence on the determination, receiving the control signal at the alarm unit, and generating the alarm in dependence on the control signal.

23. A method according to claim 21, wherein the alarm is generated by an alarm unit located on the aircraft.

24. A method according to claim 21, wherein the alarm is generated only if a tow key is engaged with the nose landing gear.

25. In a towing vehicle for towing an aircraft by engaging a nose landing gear, the improvement comprising an alarm unit arranged to receive a first signal from a rotation-measuring device on the aircraft, the alarm unit being further arranged to generate an alarm, for the purpose of preventing damage to the nose landing gear in dependence on the first signal, when the aircraft steering angle is greater than a predetermined value, wherein the predetermined value is close or equal to an angle beyond which there is a significant risk of damage occurring to the nose landing gear.

26. In combination, an aircraft and a steering angle warning system, wherein the aircraft comprises
   (i) a nose landing gear, and
   (ii) a rotation-measuring unit completely located on the aircraft, which is arranged to output a first signal dependent on the steering angle between the nose landing gear and the longitudinal axis of the aircraft fuselage, and the steering angle warning system
   (a) comprises the rotation-measuring unit,
   (b) is arranged to alert the driver of a tow vehicle, when such a tow vehicle is attached to the aircraft for towing the aircraft on the ground, when there is a risk of damage occurring to the aircraft nose landing gear because of excessive steering angle when towing,
   (c) includes an alarm unit that is suitable for alerting the driver of such a tow vehicle, and
   (d) is arranged to activate the alarm unit, for the purpose of preventing damage to the nose landing gear, the alert being generated in dependence on the first signal, when the steering angle is greater than a predetermined value, wherein the predetermined value is close or equal to an angle beyond which there is significant risk of damage occurring to the nose landing gear.

27. A combination of aircraft and a steering angle warning system according to claim 26, wherein the alarm unit is provided separately from the aircraft.

28. A combination of aircraft and a steering angle warning system according to claim 26, further comprising a tow vehicle attached to the aircraft for towing the aircraft on the ground.

29. A combination of an aircraft and a steering angle warning system according to claim 28, wherein the alarm unit is located on or in the tow vehicle.

30. A method of warning the driver of an aircraft towing vehicle that there is a risk of damage to the aircraft as a result of excessive steering angle to the nose landing gear of the aircraft being towed, the method comprising the steps of:
   (i) providing an aircraft having a fuselage and a nose landing gear, the nose landing gear including a rotation-measuring unit which is completely located on the aircraft and which is arranged to measure the steering angle between the nose landing gear and the longitudinal axis of the aircraft fuselage,
   (ii) providing a manually operated tow vehicle,
   (iii) connecting the tow vehicle to the aircraft,
   (iv) towing the aircraft by means of a human driver operating the tow vehicle,
   (v) using the rotation-measuring unit to determine whether the steering angle between the nose landing gear of the aircraft and the longitudinal axis of the aircraft fuselage is greater than a predetermined value, and
   (vi) if the steering angle is greater than the predetermined value, alerting the driver of the tow vehicle by means of generating an alarm for the purpose of preventing damage to the nose landing gear.

* * * * *